(12) United States Patent
Celik et al.

(10) Patent No.: US 8,313,561 B2
(45) Date of Patent: Nov. 20, 2012

(54) RADIAL BED VESSELS HAVING UNIFORM FLOW DISTRIBUTION

(75) Inventors: Cem E. Celik, Grand Island, NY (US); Mark W. Ackley, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 290 days.

(21) Appl. No.: 12/897,942

(22) Filed: Oct. 5, 2010

(65) Prior Publication Data
US 2012/0079938 A1    Apr. 5, 2012

(51) Int. Cl.
*B01D 53/04*    (2006.01)
(52) U.S. Cl. .............................. 95/96; 96/108
(58) Field of Classification Search ............ 96/108, 96/121; 95/90, 95, 96, 130; 422/211
See application file for complete search history.

(56) References Cited

U.S. PATENT DOCUMENTS

| | | | |
|---|---|---|---|
| 4,541,851 A | 9/1985 | Bosquain et al. | |
| 5,165,900 A * | 11/1992 | Miksitz | 422/213 |
| 5,372,792 A | 12/1994 | Mueller et al. | |
| 5,759,242 A | 6/1998 | Smolarek et al. | |
| 5,814,129 A | 9/1998 | Tentarelli | |
| 5,827,485 A | 10/1998 | Libal et al. | |
| 5,836,362 A | 11/1998 | Ackley et al. | |
| 5,882,385 A | 3/1999 | Bosquain et al. | |
| 6,086,659 A | 7/2000 | Tentarelli | |
| 6,506,234 B1 * | 1/2003 | Ackley et al. | 95/96 |
| 7,128,775 B2 | 10/2006 | Celik et al. | |
| 7,311,763 B2 * | 12/2007 | Neary | 96/121 |
| 2006/0254420 A1 | 11/2006 | Monereau et al. | |

FOREIGN PATENT DOCUMENTS

| | | |
|---|---|---|
| DE | 3939517 A1 | 6/1991 |
| DE | 3939518 A1 | 6/1991 |
| DE | 19600549 | 7/1997 |
| DE | 19735389 C1 | 9/1998 |
| GB | 810700 | 3/1959 |

OTHER PUBLICATIONS

Chang, H.C. et al., "Design Criterion for Radial Flow Fixed-Bed Reactors", *AIChE Journal*, vol. 29, No. 6, pp. 1039-1041 (1983).
Ergun, S., "Fluid Flow Through Packed Columns", *Chem. Engr. Progress*, vol. 48, pp. 89-94 (1952).
Green, et al., "Fluid and Particle Dynamics", *Perry's Chemical Engineers' Handbook*, 8th Ed., pp. 6-32 to 6-34 (2008).
Heggs, P.J., et al., "The modeling of fluid-flow distributions in annular packed beds", *Gas Sep. Purif.*, vol. 8, No. 4, pp. 257-264 (1994).

(Continued)

*Primary Examiner* — Frank Lawrence, Jr.
(74) *Attorney, Agent, or Firm* — Salvatore P. Pace

(57) ABSTRACT

The present invention relates generally to radial flow vessels and processes to achieve even fluid flow distribution through the bed during purification, separation or reaction processes. The radial bed vessel is designed such that the ratio of the cross-sectional flow areas of the flow channels is in proportion to the ratio of the mass flow rates of the process gas with the proportionality constant between 0.7 and 1.4. In addition, the channels each have a cross-sectional flow areas such that the pressure change within each channel is less than or equal to 10% of the pressure drop across the bed of active material under the process operating conditions for the particular gas employed.

30 Claims, 6 Drawing Sheets

OTHER PUBLICATIONS

Heggs, P.J., et al., "Evaluation of pressure profiles and overall pressure drop for flow through annular packed bed configurations", *Gas Sep. Purif.*, vol. 9, No. 3, pp. 171-180 (1995).

Heggs, P.J., et al., "Prediction of flow distributions and pressure changes in multi-layered annular packed beds", *Gas Sep. Purif.*, vol. 9, No. 4, pp. 243-252 (1995).

Kareeri, a.A., et al., "Simulation of Flow Distribution in Radial Flow Reactors", *Ind. Eng. Chem. Res.*, vol. 45, pp. 2862-2874 (2006).

Grenier et al., "Adsorption Purification for Air Separation Units", *Cryogenic Processes and Equipment*, ASME (1984), pp. 143-148.

von Gemmingen, "Designs of Adsorptive Driers in Air Separation Plants", *Reports on Science & Technology*, No. 71 (1994), pp. 8-12.

\* cited by examiner

RADIAL BED VESSELS HAVING UNIFORM FLOW DISTRIBUTION

FIELD OF THE INVENTION

The present invention relates generally to managing fluid flow distribution in purification, separation or reaction processes using radial flow vessels. More specifically, this invention is directed to the design, process and apparatus for the use of radial flow vessels or reactors to achieve uniform fluid flow distribution through the bed of active material during such processes.

BACKGROUND OF THE INVENTION

Fluid purification, separation or reaction processes using active materials such as adsorbents and/or catalysts are well known in the art and there are multiple vessel designs in use today for these types of processes. Examples of such vessels include both vertically and horizontally oriented cylindrical vessels with upward or downward gas flow through the bed of adsorbent and/or catalytic material during the process. A third type of vessel, as employed herein, is oriented with a vertical central or longitudinal axis and an internal design that directs the process gas flow radially through the bed. This radial flow design consists of a cylindrical pressure vessel enclosing gas permeable concentric inner and outer baskets to contain a bed of one or more layers of active material. One common use and example of these vessels is in adsorption processes for the separation or purification of gases.

As the size of these systems, particularly adsorption based gas separation systems, increases to meet the growing product demand; there is a need to provide larger pressure vessels without significantly increasing the footprint (ground area requirements) of the vessels. This is a difficult challenge because the higher fluid throughput demands a proportional increase in the frontal flow area of the vessels. Radial flow designs offer the ability to increase frontal flow area by increasing the height of the vessel without substantially altering the vessel footprint. Furthermore, radial flow designs offer a more efficient means of increasing flow area compared to either horizontal or axial flow vessel designs.

One commercial example is the increasing demand for larger cryogenic air separation units (ASUs) to meet the growing needs for large quantities of oxygen and nitrogen used in various industrial processes. ASUs require front end purification vessels (adsorption vessels) to purify the feed air stream by removing carbon dioxide, water, trace hydrocarbons and other contaminants prior to the air entering the ASU. This removal is typically accomplished through gas adsorption processes. Larger ASUs require larger "prepurification units", as they are commonly known; to treat the incoming feed air prior to the cryogenic distillation process. Larger units present a challenge to vessel designers when trying to control the size of the vessel because higher throughput of feed air demands a proportional increase in the frontal flow area provided by the vessels resulting in larger, more costly vessels. While many types of vessel designs are used in these prepurification units, the radial flow designs are of the most commercial interest for large ASU applications.

Radial flow vessels, also known as "radial bed vessels", are characterized by a packed bed of active material contained between at least two concentric cylindrical porous or perforated members fixed within the vessel. These cylindrical members are commonly referred to as "baskets" and contain the active material there between. Fluid such as a gas containing two or more components enters either at the top or bottom of the pressure vessel and is directed into an outer channel formed between the solid wall of the pressure vessel and the cylindrical porous outer basket. The fluid then flows radially through the porous wall of the outer basket, through the packed bed of active material and exits through the porous wall of the inner basket into a central channel (inner channel) aligned with the axis of the pressure vessel. The fluid then exits the pressure vessel at the top or bottom of the pressure vessel as desired. Alternatively, fluid flow can be directed into an inner channel and exits the bed through the outer channel. If such vessel is used in an adsorption based gas purification or separation process, feed and purge (regeneration) gases typically flow in the reversed direction to each other through the bed and channels.

Radial bed vessels can be designed to provide low pressure drop and can accept higher flow rates without the threat of fluidizing the material in the bed, i.e. because the active material is inherently constrained in the direction of flow by the concentric baskets. These materials can be "packed" densely within the bed to create low void volume and to improve process efficiency. However, such vessels and the packed beds within may suffer from non-uniform or inconsistent fluid flow distribution if designed improperly. This flow problem, known as flow maldistribution, leads to early breakthrough of impurities in adsorbers, low conversion efficiency in chemical reactors or generally less-desired fluid passing through the active material bed, i.e. resulting in lower purity product and lower process efficiency with the corresponding inefficient use of the bed.

Numerous methods have been previously employed to improve the flow distribution in the radial bed vessels. For example, U.S. Pat. No. 5,759,242 utilizes a tapered outer vessel wall to create a conical outer channel and hence to achieve enhanced flow distribution. U.S. Pat. Nos. 4,541,851 and 5,827,485 insert a conical distributor element within the inner channel to create similar effect in the inner channel. To further improve the flow distribution in a radial flow vessel with tapered outer channel, U.S. Pat. No. 7,128,775 uses variable perforation patterns on the inner and outer baskets. Alternatively, U.S. Pat. No. 5,814,129 uses an elongated perforated baffle inserted into the channels to enforce a serpentine flow path within the inner or the outer channel. These patents utilize complex mechanical designs and/or additional equipment installed within the vessel in an attempt to improve flow distribution. Such means complicate fabrication and increase cost of the vessel. Moreover, none of these patents disclose design guidelines, criteria, or range of operation conditions necessary to achieve uniform flow distribution within a radial bed vessel. The phrases "radial bed vessels" and "radial bed reactors" are used interchangeably herein to incorporate all of the processes included in the present invention.

Several academic studies have investigated distribution of flow in radial flow reactors. In a series of studies, Heggs et al. (Gas Sep. Purif., vol. 8, no. 4, 257-264 (1994), Gas Sep. Purif., vol. 9, no. 3, 171-180 (1995), Gas Sep. Purif., vol. 9, no. 4, 243-252 (1995)) investigated radial flow distribution in a small (0.34 m diameter, 0.26 m length) annular carbon bed by developing a model of the flow to predict bed and channel pressure profiles. The ratio of the center pipe to outer annulus cross-sectional areas was 0.42 and the maximum pressure drop across the bed was 720 Pa (0.1 psi).

Chang et al. (AIChE J., vol. 29, no. 6, 1039-1041 (1983)) conducted an analytical study of small radial flow fixed-bed reactors (0.12 m diameter, 1.0 m length) to determine the effect of non-uniform flow distribution upon reactor conversion efficiency. They concluded that "π-flow" (flow in inner and outer channels in opposite directions) is always better than "z-flow" (flow in the same direction in both inner and outer channels). It was suggested that an ideal or optimum flow profile would be obtained when the ratio of center pipe and annulus cross sectional areas was equal to one and that the ratio of channel pressure drop to bed pressure drop was equal to zero, i.e. channel resistances equal to zero. However, Chang, et al. also noted that channel resistance is finite and typically of the order of 20% of the bed resistance. The effects of catalyst porosity and vessel diameter upon flow distribution were characterized in terms of the pressure drop ratio and the difference in the flow between the center pipe and outer annulus.

More recently Kareeri et al. (Ind. Eng. Chem. Res., 45, 2862-2874 (2006)) introduced computational fluid dynamics (CFD) to investigate the effect of flow distribution upon the "pinning" phenomena in radial flow moving bed reactors. Kareeri, et al. conducted a survey of the literature (those noted above as well as many others) and concluded that "previous analytical and numerical models for studying the flow distribution in a radial flow reactor are limited and rather simplified." As a result, 3-D CFD models were developed and used to study the flow distribution in small radial flow reactors (0.5 m diameter, 1.68 m length) with maximum bed pressure drop less than about 160 Pa (0.023 psi).

While the academic studies provide tools and methodologies for predicting pressure and flow profiles, the applications have been predominately aimed at chemical reactors and limited to very small scale vessels. "π-flow" configurations have been consistently recommended. The low flows and small channel resistances resulting from these studies of small reactors inherently produce minimal flow maldistribution. The very low bed resistances are too low to be practical or representative of beds in large industrial scale reactors and purifiers. None of these studies address the issues that arise when the inlet and exit flows are appreciably different, e.g. in bulk separations. Thus, there is a need to quantify vessel and flow parameters required to achieve uniform flow distribution in industrial scale reactors and purifiers applicable to a variety of flow configurations (e.g. "z-flow" and "π-flow"). Furthermore, such methodology must succeed within the imposed structural, induced thermal and manufacturing requirements inherent in industrial scale vessels and processes. The present invention addresses these needs.

It is essential to achieve uniform fluid flow distribution through industrial scale radial bed vessels for successful operation of these processes. The vessel geometry (including the size of inner and outer channels and overall vessel diameter); the bed height and the bed transfer length; the packed bed properties (such as the average particle size and the bed void fraction or bed porosity); gas properties (such as density and viscosity); and the process conditions (such as flow rate, pressure and temperature of the fluid) all contribute to the flow distribution in radial bed vessels. A proper vessel design should result in uniform flow distribution of both the feed and purge (regeneration) fluid flows. Thus, radial bed vessels are provided herein with properly designed inner and outer channels and bed pressure drop requirements leading to vessels that are less expensive and easier to fabricate while achieving better flow distribution.

In addition to affecting flow distribution, the vessel geometry has also an important impact on achieving optimum process performance. For example, cycle time in cyclic separation processes and conversion efficiency in reaction processes depend upon the transfer length or depth of the bed. In other words, flow distribution and process performance are interrelated or coupled and this relationship may vary with the type of process. "z-flow" configuration is often desired as may be dictated by external heat loss considerations, process piping requirements, etc. The prior teachings have struggled with such complexities and thus no clear teaching for uniform flow distribution has been identified. Such deficiencies are overcome in the present invention wherein specific criteria have been developed which may be applied universally in radial bed configurations to achieve relatively uniform flow distribution and therefore overcome any degradation in process performance caused by maldistribution of fluid flows.

BRIEF SUMMARY OF THE INVENTION

The present invention is a radial flow vessel exhibiting design features that achieve or result in uniform fluid flow distribution in adsorption or catalytic based purification, separation or reaction process. The radial flow vessel is cylindrical with internal porous baskets containing a bed of active material. The vessel is designed such that the ratio of the cross-sectional areas of the inner and the outer channels is proportional to the ratio of mass flow rates of the process gas flowing in and out of the inner and the outer channels, respectively. In addition, the inner channel and the outer channel each have a cross-sectional area and the annular basket assembly (including at least inner and outer porous baskets) has a bed height and a bed transfer length sized such that the pressure drop within the inner and the outer channels is less than or equal to 10% of the pressure drop across the bed of active material at the process fluid operating conditions.

Accordingly, a radial bed vessel is provided comprising:

a substantially cylindrical vessel shell having a vertical longitudinal axis, an upper cap and a lower cap;

a substantially cylindrical porous outer basket disposed concentrically inside the shell along the longitudinal axis and attached to at least one of the upper cap and the bottom cap;

a substantially cylindrical porous inner basket disposed concentrically inside the porous outer basket along the longitudinal axis and attached to at least one of the upper cap or the lower cap of the vessel;

a substantially annular outer channel disposed between the vessel shell and outer basket along the longitudinal axis having a cross-sectional flow area capable of transporting either a feed fluid or a product fluid;

a substantially cylindrical inner channel disposed inside the inner basket along the longitudinal axis having a cross-sectional flow area capable of transporting either a feed fluid or a product fluid;

a substantially annular bed composed of at least one layer of active material disposed in the annular space between the inner and the outer baskets; wherein:

the ratio of the cross-sectional flow area of the channel transporting the feed fluid to the cross-sectional flow area of the channel transporting the product fluid is in proportion to the ratio of the mass flow rate of the feed fluid to the mass flow rate of the product fluid with the proportionality constant greater than or equal to 0.7 and less than or equal to 1.4; and the annular bed has a bed height and a bed transfer length sized such that the pressure change over the lengths of the inner and the outer channels are each less than or equal to 10% of the pressure drop across the bed under the process operating conditions for the particular fluid employed.

A fluid purification, separation or reaction process is also provided.

BRIEF DESCRIPTION OF THE DRAWINGS

For a more complete understanding of the present invention, reference should be made to the following Detailed Description taken in conjunction with the accompanying drawings in which.

DETAILED DESCRIPTION OF THE INVENTION

Figure 1:
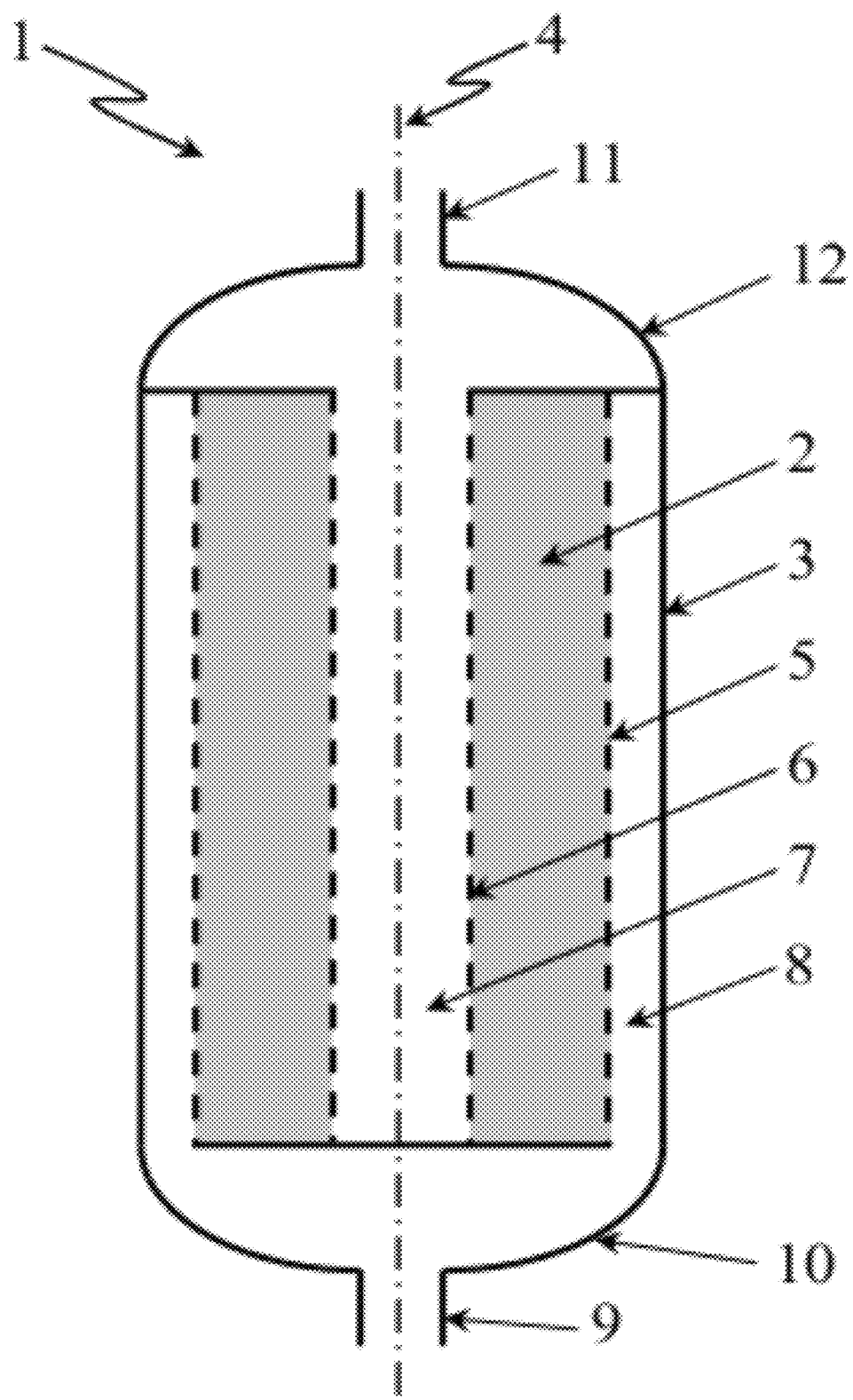
FIG. 1 is a schematic of the radial flow vessel of one embodiment of this invention.

The present invention is a radial flow vessel designed with features that achieve uniform fluid flow distribution in catalytic or adsorption based fluid purification, separation or reactive processes. Successfully achieving uniform flow distribution is essential for optimum performance of any bed of active material, and controlling the flow distribution characteristics as the fluid flows through the bed is of particular importance. Uniform or "uniform" fluid flow distribution as used here means that the variation in the magnitude of bed velocity along the bed height (axial direction) is less than 5%, i.e. the magnitude of the radial velocity vector at the face of the inner or outer basket varies by less than 5% over the entire height of the porous part of the basket assembly or alternatively over the bed height. Uniformity in flow distribution may also be similarly defined by the minimal variation in resistance or pressure drop across the bed of active material along the bed height.

For the purpose of the present invention, transfer length and bed depth are equivalent terms describing the distance between the inner and outer baskets measured along the radial direction in the vessel. Fluid enters and exits the annular bed at one or the other faces of the inner and outer baskets having a velocity oriented radially (referred hereafter as a "radial velocity"). Likewise, fluid primarily flows within the inner and outer channels having a velocity oriented parallel to the longitudinal axis of the vessel (referred hereafter as a "longitudinal" or "channel" velocity) as the fluid is uniformly drawn off the channel into the bed, or the fluid is uniformly dispersed into the channels from the bed, through the perforations. "Bed height" refers to the overall effective or working longitudinal height of the bed of active material contained between the porous inner and outer baskets. For clarity, it is the height of the bed through which the fluid flows radially.

It is important to note that in large industrial radial flow reactors it is intended, for the purpose of this invention, that the resistance to flow across the perforated basket material is small compared to the bed resistance. In this regard, the open area of the basket walls is preferably greater than 15% and most preferably greater than 25%. Such criteria maintain low basket flow resistance and also provide structural design flexibility for the baskets to satisfy dynamic and static loads imposed upon the basket assembly. Thus, the overall bed/basket flow resistance is controlled by the active material bed resistance rather than by using very low basket wall porosity (open area ≦5%) as suggested by Kareeri, et al. Such low open area of the perforated baskets results in high velocity flow at the face of the basket and may actually create dead zones within the bed where active material is not utilized. Such dead zones would be located in areas close to the basket surface and behind the solid areas in the basket walls. Using a high resistance basket wall to produce a uniform velocity distribution along the face of the wall creates a false indication of uniform flow through the interior of the active material bed. The intent of low flow maldistribution in this invention is to direct the fluid through the bed so that all of the active particles within the bed are contacted uniformly by the flow.

Conventional purification, separation or reaction processes often employ loosely packed beds, such non-uniform packing adds to the difficulty of obtaining even flow distribution through the bed. Dense packing of beds, as described in U.S. Pat. No. 5,836,362, produces a more uniform and stable packing of active material within the bed and also results in a higher pressure drop across the bed. Although not required, dense packing the bed further enhances the benefits of the present invention. Dense packing is reflected in the resultant packing density or the bed void fraction, both depending upon the physical properties of the adsorbent. For the purposes of this invention, the bed void fraction (interparticle volume divided by total bed volume) should be greater than or equal to 0.30 and less than or equal to 0.50, preferably greater than or equal to 0.32 and less than or equal to 0.42. The void fraction is influenced by the shape of the particle, the breadth of the particle size distribution and the degree to which the bed is packed to its maximum density. In general, particles with a mass average diameter of equal to or greater than 0.5 mm and of less than or equal to 5.0 mm, preferably a mass average diameter of equal to or greater than 1.0 mm and of less than or equal to 4.0 mm, are intended for use in the radial flow vessels of this invention. The "mass average" particle size as used in this description means the average diameter as determined by separating a representative sample of the active material through a set of US Sieve Series screens (ASTM E-11) and weighing the particles retained on each screen to determine the particle size distribution and average diameter by methods well known to those skilled in the art.

Without limitation, this invention is preferably directed to radial flow vessels used in adsorption based gas separation processes, such as processes for the separation of gases by exploiting differences in their adsorptive properties. Most preferred are radial bed vessels employed in gas separation processes such as Pressure Swing Adsorption (PSA), Vacuum Swing Adsorption (VSA), Vacuum Pressure Swing Adsorption (VPSA) or Thermal Swing Adsorption (TSA) processes as are well known in the art. For example, radial flow vessels are used for (TSA) processes adapted to the pre-purification of air prior to cryogenic air separation and for bulk separation of air using PSA or VPSA processes.

Flow distribution through a packed bed is reflected by the resulting pressure profiles (gradients) in the inner and outer vessel channels. The pressure difference between the two channels at any local position along the height of the bed provides the driving force for the fluid to flow through the packed bed. Furthermore, this localized pressure driving force (pressure drop) across the bed determines the amount of flow through each local segment of the bed at the corresponding bed height. Maintaining a uniform pressure drop across the bed at all local positions along the bed height, while simultaneously minimizing the pressure drop in each channel, insures a uniform distribution of radial flow through the bed and over the entire height of the bed. As used herein, "bed" refers to the one or more layers of densely packed active material filling the volume or space between the concentric baskets within the vessel. Relatively higher pressure drop across the bed (bed pressure drop) compared to the total pressure gradient within the channel (channel pressure drop or rise) allows the fluid to fill the inner and outer channels evenly and helps to prevent the fluid from flowing preferentially through disparate sections of the bed. In this way, the bed itself is utilized as a flow distributor and the need for complex vessel fabrication and/or costly flow distribution devices or methods is avoided.

For convenience, the pressure change within the channels will be described below as a pressure drop, which is the more typical effect, but notwithstanding, this invention is intended to include pressure rises wherein the pressure within a channel may increase.

The pressure drop in the inner and outer channels, as well as through the bed, can be reasonably estimated from the process conditions, vessel geometry and bed properties and characteristics using carefully selected analytical formulations. This pressure drop estimation methodology is then applied in adjusting the vessel parameters to satisfy the criteria developed above for uniform flow distribution, i.e. low inner and outer channel pressure drop relative to bed pressure drop. In particular, the sizes of the inner channel, the outer channel, the bed transfer length (depth of the bed) and bed height can be determined to yield uniform flow distributions for a given operational condition of the bed and process. More specifically, these pressure predictions can be used to design a radial flow vessel with its inner and outer channels sized to ensure that the ratio of cross-sectional flow areas of channels are substantially equal to the ratio of mass flow rates in and out of the vessel and that the channel pressure drops are at most 10%, preferably at most 5%, of the bed pressure drop.

While not intending to limit the scope of this invention, the invention will be described below with reference to the preferred gas adsorption process. In the design of an adsorption bed and vessel, the amount of adsorbent material needed is determined by the type of process, contaminants to be removed and the desired product purity and yield. Additional important design factors include mass flow rate, process conditions (e.g. cycle time, pressure, temperature) and the physical and chemical characteristics of adsorbent material. The size and geometry of the baskets are defined by the inner and outer radius of the bed (the difference between these parameters is known as the bed transfer length) and the bed height. The sizes of the inner and outer channels for a given mass flow rate, bed transfer length and bed height must be designed correctly as described above to achieve uniform flow distribution. The overall vessel geometry is then determined from these considerations. Flow maldistribution along the bed height leads to early breakthrough of adsorbed gas or impurities into the product channel, which eventually results in under-utilization of adsorbents and under-performance of the bed. A process with efficient and maximized bed utilization typically requires less than 5% variation in the radial flow velocity over the entire bed height. Similarly, high bed utilization requires a relatively low variation in bed pressure drop over the entire bed height.

In a reactor/vessel with evenly distributed flow, each particle or bed segment containing adsorbent particles is exposed to or otherwise treats approximately the same number of fluid molecules from the feed gas. When the flow is non-uniformly distributed then some bed segments are exposed to more or less molecules than other segments. Those segments exposed to higher localized flow will experience contaminant breakthrough earlier in adsorption processes or have lower conversion efficiency in reaction processes, than those segments operating at lower velocity. Such non-uniform flow distribution through the bed is undesirable and results in reduced process performance.

For a purification process, the rate of mass flow entering and exiting the bed remain relatively unchanged except for variation due to the small amounts of contaminants removed from the feed gas by adsorption and subsequently returned to the purge gas through regeneration (desorption). In contrast to purification processes, the rate of mass flow exiting the vessel may be substantially less than the rate of mass flow entering the vessel in bulk separations due to the greater amount of feed gas (bulk) components retained in the adsorbent. Thus, the first step in controlling the channel flow resistances requires that the area ratio of inner and outer channels be approximately equal to the ratio of mass flow rates in these channels. Therefore, the sizes and cross-sectional areas of the inner and outer channels, also referred to as feed or product channels, can be significantly different for a vessel designed for purification compared to those channels designed for bulk separation. Nevertheless, a single criterion is established to determine the relationship between the inner and outer channel areas that can be applied to purification, bulk separation and reaction processes.

From the continuity equation, the mass flow rate in or out of either channel can be expressed:

$$m_i = (\rho \cdot A \cdot V)_i$$

m represents the total mass flow rate entering or exiting a channel, $\rho$ is the fluid density, A is the channel cross sectional area, V is the velocity at the channel entrance or exit and the subscript i represents either the inner channel (IC) or the outer channel (OC). Noting that the fluid density is relatively constant throughout the vessel and channels and it is desirable to maintain approximately the same velocity entering the feed channel and exiting the product channel, it is then desirable to maintain the same mass flux (kg/m$^2$ s) in the channels:

$$\frac{m_{IC}}{A_{IC}} = \frac{m_{OC}}{A_{OC}}$$

For the purpose of this invention (where changes in the fluid density between the feed and product flows are generally small), the flow rate and flux in the channels has been described in terms of mass. Should the case arise where the fluid density is appreciably different between the flow channels, the above flow equations can be applied with respect to a molar flow or flux.

In the case of purification (or in some reactions), $m_{IC} = m_{OC}$ and the above relationship indicates that the inner and outer channel cross sectional areas should be equal. Both results, i.e. equal area or equal mass flux, represent ideal conditions that help to insure balanced flow conditions between the inner and outer channels.

However, the equal area ratio condition is neither sufficient nor even necessary for uniform flow distribution, e.g. bulk separation, or when the channel cross sectional areas are too small. This is why the additional condition relating the channel pressure drops to the bed pressure drop is required as described below.

For industrial scale radial flow reactors with relatively high fluid throughput, it is important to provide sufficiently large channel cross sectional areas to maintain the channel velocities as low as possible. This in turn results in relatively low channel pressure drop. For the purpose of this invention, it has been found that the equal mass flux condition can be relaxed somewhat while still achieving uniform flow distribution, i.e.

in combination with the criteria that the channel flow resistances must be small compared to the bed resistance. The feed and product flows can be introduced or withdrawn, respectively, from either the inner channel (or annulus) or the outer channel (annulus). Thus, the area ratio of these channels (flow areas) can be more directly described in terms of the type of mass flow, i.e. feed or product, being carried in that channel. The following area ratio design criteria have been found to meet the requirements of this invention:

$$\frac{A_{feed}}{A_{product}} \geq 0.70 \cdot \left(\frac{m_{feed}}{m_{product}}\right) \text{ for } A_{feed} < A_{product}$$

$$\frac{A_{feed}}{A_{product}} \leq 1.40 \cdot \left(\frac{m_{feed}}{m_{product}}\right) \text{ for } A_{feed} > A_{product}$$

The subscripts "feed" and "product" refer to the type of fluid being carried in the channel. The above channel area relationships apply regardless of whether the inner or outer channel is carrying feed or product flow. The equal mass flow rate relationship is used to make a first approximation of the area ratio, which can be subsequently relaxed to satisfy the above condition. This provides the necessary flexibility in the design geometry to satisfy the structural and process requirements simultaneous with achieving an acceptable flow distribution. Thus, the ratio of the flow area of the feed channel and the product channel is in proportion to the ratio of the mass flow rates of the feed fluid and product fluid and the proportionality constant is between about 0.7 and about 1.4, and preferably between 0.85 and 1.2.

Referring now to FIG. 1, radial bed vessel (1) is shown with an upper cap (12), lower cap (10), and a cylindrical pressure vessel shell (3) along longitudinal axis (4). The bed (2) is contained between an outer basket (5) and inner basket (6) which forms an internal annular space containing the active material. The walls of outer basket (5) and inner basket (6) are made of a porous material or otherwise have perforations to allow the process gas to flow through the bed (2). The cylindrical volume inside the inner basket (6) is referred as inner channel (7), and annular volume between the walls of pressure vessel shell (3) and outer basket (5) is referred to as outer channel (8). The feed gas, for example, is introduced to the vessel through an inlet nozzle (9) attached to the lower cap (10) of the vessel (1), and the product gas is withdrawn from the vessel through the exit nozzle (11) attached to the upper cap (12) of the vessel (1).

The bed (2) is typically composed of one or more concentric layers of active materials. The active material is normally free flowing. For adsorption based processes, such as air purification or other separations, an adsorbent material is used and is typically a zeolite-type molecular sieve material as is known and commercially available. The adsorbent material can be composed of a single layer, or in a two or more concentric layer configuration where the first layer (such as activated alumina) nearest the feed inlet removes water from the feed gas and the second layer (such as zeolite molecular sieve) adsorbs a selected gas component such as carbon dioxide in purification or nitrogen in air separation. A third layer may be used to adsorb or react one or more trace contaminants (such as CO or $N_2O$), and so on. In reactive type processes, the active material can be selected from any catalyst material known to be effective in fixed bed vessel processes. These catalysts are normally free flowing and examples include various types of high-silica molecular sieves, hopcalite, alumina and silica substrates impregnated with metal and metal oxides (e.g. group VIII metals), and other known catalysts used in chemical reactions. The adsorbent or catalyst is preferably densely packed to minimize settling and other particle motion and to maximize process efficiencies as is known. The free flowing material may be any agglomerated material in the form of beads, pellets, granules, etc. as are commercially available in which the activity of the material satisfies the separation or reaction requirements of the process.

Figure 2:
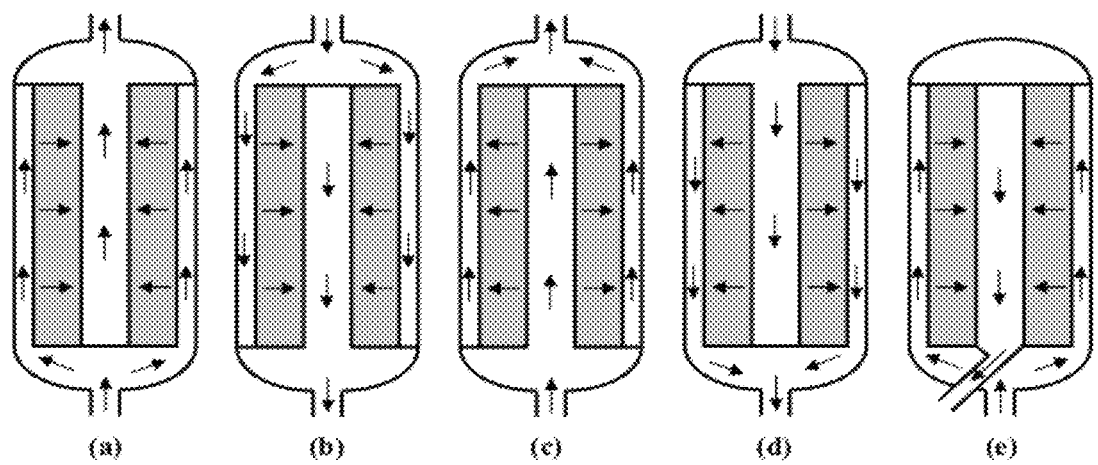
FIG. 2 is a series of schematic views of a radial flow vessel showing varying flow paths through the vessel.

As is understood by the skilled person, the feed gas flow direction within the radial bed can be radially inward or radially outward as best understood with reference to FIGS. 1 and 2. The feed gas can be introduced to the radial bed vessel (1) from inner channel (7) and flows radially outward to outer channel (8), or it can be introduced from outer channel (8) and flows radially inward to inner channel (7). In a typical radial bed vessel, feed gas can be introduced to the annular bed (2) through the outer channel (8) and flows radially inward through the bed (2), and then the product gas exits the vessel by passing through the inner channel (7). Such feed gas can enter into the vessel from lower cap (10) and flow axially (parallel to the longitudinal axis of the vessel) upward in the inner (7) and outer (8) flow channels (FIG. 2a), or enter into the vessel from upper cap (12) and flow axially downward in the inner and outer flow channels (FIG. 2b). Alternatively, feed gas can also be introduced to the inner channel (7), flow radially outward through the bed (2), and then the product gas exits the vessel through the outer channel (8) (FIG. 2c-2d). Such gas can enter into the vessel from lower cap (10) and flow axially upward in the flow channels (FIG. 2c) or enter into the vessel from upper cap (12) and flows axially downward in the flow channels (FIG. 2d). The axial direction of flow as shown in FIGS. 2a-2b-2c-2d is the same in the inner and outer channels (often termed "z-flow" in the literature). Alternatively, the flow in these channels can also be in the opposite direction to each other (often termed "π-flow" in the literature), as shown in FIG. 2e.

For the case of channel flow paths in the opposite directions as depicted in FIG. 2e, feed gas enters into the vessel from inlet nozzle (9) in lower cap (10), then enters into bed (2) from outer channel (8) and exits into the inner channel (7) by following a radially inward flow path through bed (2), and exits the vessel from lower cap (10) through a separate outlet nozzle. Other possible variations to this flow configurations include; i) gas enters into the vessel from the upper cap, then enters into the bed from the outer channel and exits into the inner channel by following a radially inward flow path through the bed, and exits the vessel from the upper cap, ii) or gas enters into the vessel from the lower cap, then enters into the radial bed from the inner channel and exits into the outer channel by following a radially outward flow path through the bed, and exits the vessel from the lower cap, iii) or gas enters into the vessel from the upper cap, then enters into the radial bed from the inner channel and exits into the outer channel by following a radially outward flow path through the bed, and exits the vessel from the upper cap. In those configurations where the flow enters and exits from the same end of the vessel, separate inlet and outlet nozzles are provided. While academic studies have concluded that π-flow provides better flow distribution than z-flow, this invention provides design guidelines for achieving acceptable flow distribution using either flow configuration.

In an adsorption based gas separation process, the adsorbent in the bed adsorbs the more readily adsorbable gas first, the second most readily adsorbable gas second and so on. In purification processes, an adsorbent is selected to readily adsorb the impurities. After the bed reaches some degree of saturation as determined by the purity of product desired, it is regenerated with a purge gas which removes the adsorbed gases/impurities. Regardless of the flow direction of the feed gas, the purge gas typically flows in the reverse direction of the feed gas. As shown in FIGS. 2a through 2e, there are many possible combinations of flow directions within the flow channels and through the radial bed. In a preferred mode of operation of this invention, the feed gas enters the bottom of the vessel and follows the corresponding path shown in FIG. 2a and the purge gas enters through the top of the vessel and follows the corresponding path shown in FIG. 2d.

Figure 3:
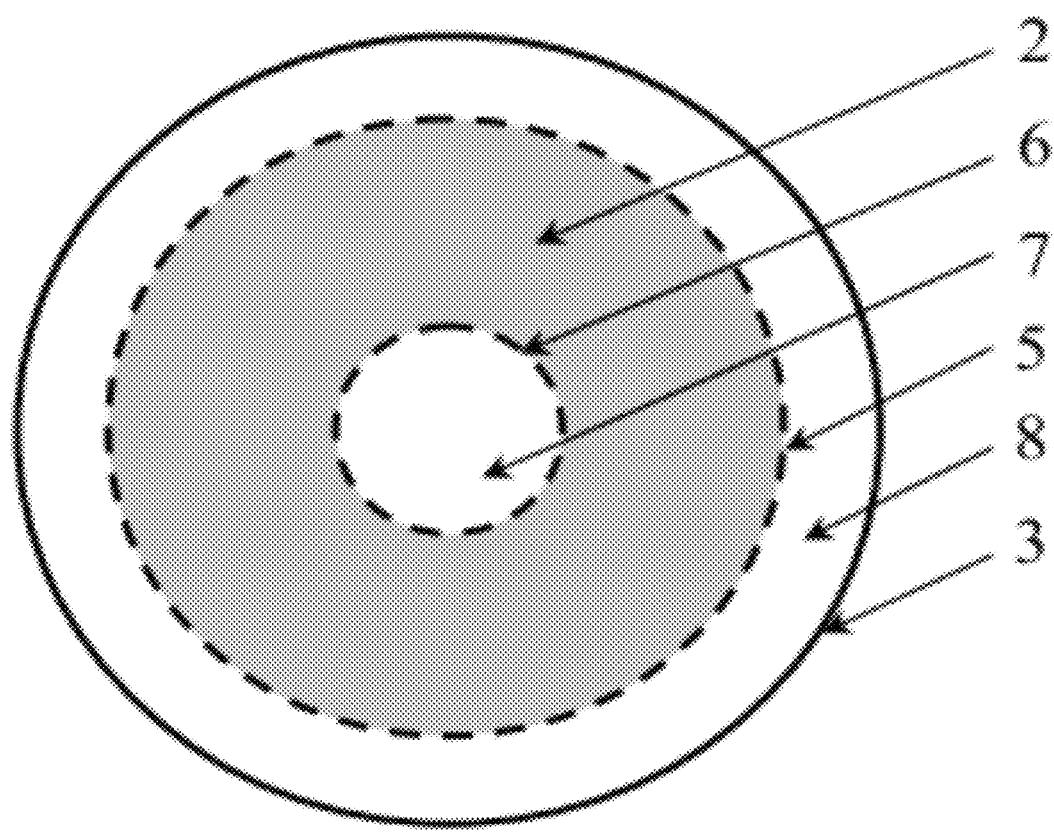
FIG. 3 is a horizontal cross-sectional view of the radial vessel of FIG. 1.

FIG. 3 shows the horizontal cross-sectional view of the radial vessel of FIG. 1. The radius of cylindrical inner channel (7), the radius of inner basket (6) and the inner radius of the bed (2) are all assumed to have the same nominal radius of $r_i$. Similarly, the outer radius of the bed (2), the radius of outer basket (5) and the inner radius of the outer channel (8) are all assumed to have the same nominal radius of $r_b$. Likewise, the radius of vessel shell (3) and the radius of outer channel (8) has the same nominal radius of $r_o$. These are valid assumptions since the thicknesses of the basket and vessel walls are significantly smaller than the radial dimensions involved. If such thicknesses are comparable relative to other radial dimensions, the formulations can easily be modified to account for it. In addition, the lengths of inner (7) and outer (8) channels and the height of the bed (2) in the axial direction are all assumed to be L. Using all these geometrical data;

the cross-sectional flow area of the inner channel (7) is expressed as $A_{IC} = \pi \cdot r_i^2$;

the cross-sectional flow area of the outer channel (8) is expressed as $A_{OC} = \pi \cdot (r_o^2 - r_b^2)$ the area of the inner surface of the bed (2) is expressed as $A_{BI} = 2 \cdot \pi \cdot r_i \cdot L$; and the area of the outer surface of the bed (2) is expressed as $A_{BO} = 2 \cdot \pi \cdot r_b \cdot L$.

The pressure drop in the inner and outer channels can be successfully estimated using the teachings of this invention. By adjusting the parameters defining the bed and channel geometries in the pressure predictions, the preferred dimensions of the inner channel, the outer channel, the bed transfer length, and the bed height can be determined to satisfy the aforementioned pressure drop and area ratio criteria yielding a uniform flow distribution through the bed for a given operational condition.

Channel pressure drop is governed by the size and length of the channel as well as the density and longitudinal velocity of the gas within the channel. For a given mass flow rate (or desired product rate) and process condition (temperature and pressure), larger cross-sectional area of the flow channels results in both lower longitudinal gas velocity and lower pressure drop in the channel. On the other hand, the pressure drop across the bed is governed by density, viscosity and the radial velocity of the flowing gas along with average size of the particles in the bed, the void fraction (bed porosity) and the height of the bed. The relation for predicting pressure drop in a packed bed, known as the Ergun equation, is documented very well and widely used (Chem. Engr. Progress, vol. 48, pgs 89-94, February 1952).

One way to determine the channel and bed pressure drop is to model the flow using computational fluid dynamics analysis for the given geometry and flow conditions. However, such analysis requires multiple simulations and investigation of flow distribution for different channel dimensions. Considering the number of variables involved, such analyses may become overwhelming. An alternative approach is to estimate channel and bed pressure drops and use these estimates to design the channels and bed sizes appropriately so that aforementioned pressure drop criteria for uniform flow distribution is achieved.

Prediction of Bed Pressure Drop

Pressure drop through a packed bed is accurately estimated by the Ergun equation. However, this equation is developed for the beds in axial flow configuration. The flow area and flow velocity remain constant in an axial bed. On the other hand, the flow area and the resulting radial flow velocity vary with bed depth in a radial flow bed, i.e. velocity varies inversely with flow area. For this reason, the classical Ergun equation must be modified to accurately estimate the pressure drop in the bed of a radial flow vessel. The pressure drop in an annular bed subjected to radial flow can be expressed as:

$$\Delta P_{bed} = C_L \cdot \left(\frac{m}{2 \cdot \pi \cdot L \cdot \rho}\right) \cdot \ln\left(\frac{r_b}{r_i}\right) + C_Q \cdot \left(\frac{m}{2 \cdot \pi \cdot L \cdot \rho}\right)^2 \cdot \left(\frac{1}{r_i} - \frac{1}{r_b}\right)$$

$$\text{with } C_L = 150 \cdot \frac{(1-\varepsilon)^2}{\varepsilon^3} \cdot \frac{\mu}{d_p^2} \text{ and } C_Q = 1.75 \cdot \frac{(1-\varepsilon)}{\varepsilon^3} \cdot \frac{\rho}{d_p}$$

where $\varepsilon$ bed void fraction (interparticle void volume/bed volume)

$\mu$ viscosity of the gas $d_p$ equivalent spherical particle diameter as defined by Ergun $\rho$ density of the gas m mass flow rate of the process gas L bed height $r_b$ outer radius of the bed $r_i$ inner radius of the bed Entering the information of the process gas ($\mu$, $\rho$, m), adsorbent bed ($\varepsilon$, $d_p$), and bed geometry (L, $r_b$, $r_i$) into the equation presented above, the pressure drop in the bed can be predicted without using CFD or other extensive simulation or analysis and without the need for undue experimentation. Formulation given here is developed for single layer of material in a bed, but it can easily be extended for multiple layers of materials as would be understood by the skilled artisan.

Prediction of Inner Channel and Outer Channel Pressure Drops

Figure 4:
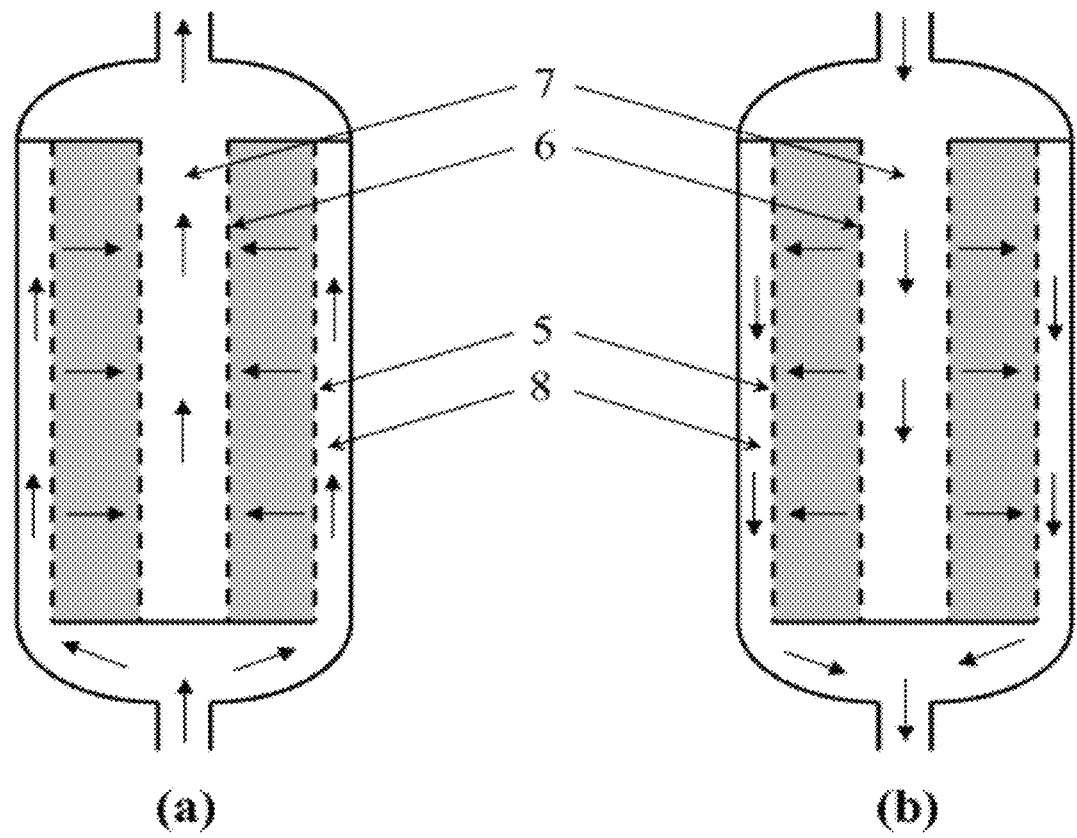
FIG. 4 is two schematic views showing the feed gas and purge gas flow directions.

Direction of flow for the feed gas (entering from the bottom of the vessel) and for the purge gas (entering from the top of the vessel) for the preferred operation of this invention are shown in FIGS. 4a and 4b, respectively. Gas flow in these channels is primarily in the axial direction, i.e. longitudinally up or down depending upon which end of the vessel the flow enters as shown in FIGS. 4a and 4b. Gas enters the bed from either one of the inner channel (7) or the outer channel (8), flows radially through the bed and exits into the remaining channel, e.g. if it enters the bed from the outer channel then it exits the bed into the inner channel and so on.

Referring to FIG. 4a, the mass flow entering into the outer channel (8) with a velocity substantially in the axial direction is uniformly drawn off from the channel to the bed along the channel length through the outer basket (5). The flow velocity in the bed on the other hand is substantially in a radially inward direction. Momentum exchange due to the change in flow direction from axial within the outer channel (8) to radial through the perforations in the outer basket (5) adds to the overall channel pressure drop. Outer channel wall friction resistance to the axial flow also contributes to this pressure drop. Referring to FIG. 4a, a similar momentum exchange occurs when the flow exits the bed through the inner basket (6) perforations and turns from the radial to the axial direction within the inner channel (7), i.e. this momentum change contributes to the inner channel pressure drop. The inner channel (7) wall friction resistance to the axial flow also contributes to the inner channel pressure drop. Therefore, the pressure drop in both the inner channel (7) and outer channel (8) is due to the combined effects of frictional resistance and inertial (momentum) pressure recovery.

Pressure drop due to momentum exchange in the inner and outer channel can be viewed in the context of the present invention as similar or analogous to pressure drop for perforated-pipe distributors (Green D., Perry R. H., *Perry's Chemical Engineers' Handbook*, 8$^{th}$ Edition, 2008). The pressure drop for a perforated pipe would depend on the flow direction; if the gas is flowing out of a pipe through the perforated holes then it is a "discharging pipe." However, if the gas is flowing into the pipe through the perforated holes then it is a "return pipe." For the feed gas flow directions shown in FIG. 4a, the annular outer channel (8) along with the outer basket (5) forms a discharge pipe, since the feed gas is discharged from the annular outer channel (8) through the outer basket (5). On the other hand, the inner channel (7) along with the inner basket (6) forms a return pipe, as gas flow is collected in the inner channel (7) by passing through the inner basket (6). Similarly for the purge gas flow directions, as shown in FIG. 4b, the inner channel (7) along with the inner basket (6) forms a discharge pipe and the outer channel (8) along with the outer basket (5) forms a return pipe.

The pressure drop in the inner and outer channels is due to the combined effects of friction and inertial (momentum) pressure recovery, and thus it can be expressed as $$\Delta P = \left(\frac{4 \cdot f \cdot L}{3 \cdot D} + 2 \cdot K\right) \cdot \frac{\rho \cdot V^2}{2}$$

where ΔP net pressure drop over the length of the channel
L perforated shell length
D perforated shell diameter
f friction factor obtained from Moody diagram (for pipe flow)
K ideal momentum recovery factor; equals to −0.5 for discharge pipes and +1.0 for return pipes
ρ density of the gas
V channel inlet velocity for discharge pipe, or channel exit velocity for return pipe and its equal to $$\frac{m}{\rho \cdot A}$$

with A being the area of the channel.

The gas flows in the inner and outer channels are typically in turbulent regimes. When the pipe friction term is relatively insignificant compared to inertial (momentum exchange) term the pressure drop in the inner and outer channels is dominated by the momentum term ($K \cdot \rho \cdot V^2$). As momentum recovery factor K is negative for a discharge pipe and positive for return pipe, pressure will increase along a discharge pipe and will decrease along the return pipe. The magnitude of pressure drop in each channel is controlled by the inlet velocity for a discharge pipe or exit velocity for a return pipe. However, for ease of calculation, the channel pressure drops are expressed in terms of the mass flow rate entering into or exiting out of the channels ($m_{IC}$, $m_{OC}$) and the cross-sectional area of the channels ($A_{IC}$, $A_{OC}$). Therefore pressure drop in the outer and inner channels can be expressed as (when frictional effects are negligible):

$$\Delta P_{OC} = \frac{K \cdot m_{OC}^2}{\pi^2 \cdot \rho \cdot (r_o^2 - r_b^2)^2} \text{ and } \Delta P_{IC} = \frac{K \cdot m_{IC}^2}{\pi^2 \cdot \rho \cdot r_i^4}$$

When the gas is introduced into the adsorbent bed from the outer channel and exits the bed into the inner channel, it is asserted here that the outer channel behaves as a discharge pipe (K=−0.5) and the inner channel behaves as a collecting pipe (K=1). On the other hand, when the gas enters into the bed from the inner channel and exits into the outer channel, the inner channel can be viewed as a discharge pipe (K=−0.5) and the outer channel a collecting pipe (K=1). The K factors, as well as friction factors, are empirical constants selected from the literature for convenience. The accuracy of the predictions can be further improved by developing factors directly related to the materials and geometry of the vessel design.

It should be noted that although the pressure rise in the discharging pipe has been reported in the small bed studies of Heggs, et al. and Kareeri, et al., a drop in pressure is more likely to occur in the channels of industrial scale reactors. As evident in the equations above including both the friction and inertial terms, these terms oppose each other in the discharging pipe configuration, i.e. frictional losses contribute to a pressure drop and momentum recovery contributes to a pressure rise. In the industrial scale reactors using rough surface perforated plates of significant open area (many perforations) the frictional losses may not be insignificant, particularly as the bed height increases. The high surface area of baskets combined with the large flows and large bed heights favor at least the frictional losses offsetting the momentum recovery in the discharge pipe. Thus, for industrial scale reactors it is advisable to include the friction term in the channel pressure drop equation and also to improve upon the accuracy of the empirical constants K and f. Regardless of pressure rise or drop in the discharging configuration, the guideline is to minimize the overall pressure drop in the channel.

By conceptualizing the flow channels of a radial bed vessel as discharge or collecting pipes, the channel pressure drops can be predicted for various values of mass flow rate of the process gas and for various channel sizes. Comparing the values of channel pressure drops to the bed pressure drop, and adjusting them by reconfiguring the vessel design provides a methodology to achieve the flow distribution criteria, i.e. to design the channels so that the channel pressure drops are significantly less than the bed pressure drop; yielding more uniform flow distribution through the bed.

Maintaining the channel pressure drops significantly less than the bed pressure drop will result in uniform flow distribution. Using the methods described above, the vessel and bed can be designed so that the channel pressure drops are preferably less than or equal to 10%, but more preferably less than or equal to 5% of the bed pressure drop. The ratio of channel pressure drop to bed pressure drop for a given mass flow or mass flow range is controlled by a combination of factors including the sizes of the channels, the shape, size and packing of adsorbent particles, the transfer length of the bed and the bed height.

The most important condition required to achieve uniform flow distribution in a radial flow vessel is that the channel pressure drops must be small compared to the bed pressure drop. These criteria are expressed as follows:

$$\Delta P_{IC} << \Delta P_{Bed}$$

$$\Delta P_{OC} << \Delta P_{Bed}$$

More specifically, it is preferred that channel pressure drops are less than or equal to 10% of the bed pressure drop:

$$\Delta P_{IC} \leq 0.10 \cdot \Delta P_{Bed}$$

$$\Delta P_{OC} \leq 0.10 \cdot \Delta P_{Bed}$$

More preferably, the channel pressure drops are less than or equal to 5% of the bed pressure drop:

$$\Delta P_{IC} \leq 0.05 \cdot \Delta P_{Bed}$$

$$\Delta P_{OC} \leq 0.05 \cdot \Delta P_{Bed}$$

The initial step is to determine the maximum allowable or desirable pressure drop across the bed. This determination will be strongly influenced by the cost of the energy of compression and the value of the product from the process. In the pre-purification of air prior to cryogenic air separation, it is preferable that bed pressure drop be less than or equal to 34.5 kPa (5 psi), preferably less than or equal to 20.7 kPa (3 psi). In PSA air separation processes for the production of oxygen it is preferable that bed pressure drop be less than or equal to 13.8 kPa (2 psi) and most preferably less than or equal to 6.9 kPa (1.0 psi). High value product and/or low cost power would tend toward higher allowable bed pressure drop. It is expected in all of these processes that the bed pressure drop will be greater than or equal to 1.0 kPa (0.15 psi). It is further expected that the pressure drop across the porous basket walls will be small and even negligible compared to the bed resistance. Such low resistance of the perforated walls of the baskets will be achieved by insuring perforated plate open areas of at least 15% and preferably at least 25%.

In general, the channel pressure drops will be small, e.g. much less than 6.9 kPa (1.0 psi). Low channel pressure drop requires low channel (longitudinal) velocity, which in turn requires sufficiently large channel cross-sectional area. It has been found in the course of this invention that these conditions are best satisfied by providing not only sufficiently large channel cross-sectional flow area but also establishing the cross-sectional flow area according to the relationship provided above, i.e.

$$\frac{A_{feed}}{A_{product}} \geq 0.70 \cdot \left(\frac{m_{feed}}{m_{product}}\right) \text{ for } A_{feed} < A_{product}$$

$$\frac{A_{feed}}{A_{product}} \leq 1.40 \cdot \left(\frac{m_{feed}}{m_{product}}\right) \text{ for } A_{feed} > A_{product}$$

Preferably, $$\frac{A_{feed}}{A_{product}} \geq 0.85 \cdot \left(\frac{m_{feed}}{m_{product}}\right) \text{ for } A_{feed} < A_{product}$$

$$\frac{A_{feed}}{A_{product}} \leq 1.20 \cdot \left(\frac{m_{feed}}{m_{product}}\right) \text{ for } A_{feed} > A_{product}$$

These conditions ensure that the pressure drops within the inner and outer channels are low as long as the channels are substantially equal in length and the mass fluxes in both channels are approximately equal. Such conditions also prevent bottle-necking of the flow in the channels.

It should be noted that large area ratios outside the above preferred ranges are to be avoided in large commercial vessels because vessel fabrication costs may be significantly increased. In bulk separation cases where the inner channel is used to transport the product flow, it may be necessary to add a plug or sealed center pipe to occlude some of the volume exposed to the product in order maximize product yield and purity. In such instances the inner channel is transformed from a cylinder to an annulus. In such bulk separation cases, the area ratio guidelines above insure that both the flow distribution requirements are maintained without significant impact upon the yield or purity of the product.

Furthermore, these conditions ensure that the fluid evenly fills the flow channels before entering into bed hence the radial flow velocity of fluid entering every segment along the bed height is substantially equal to that of every other segment. This way the bed is utilized as a flow distributor.

Once the vessel design is established in cross-section, a demand for increased product can be addressed by increasing the bed height proportional to the increase in mass flow rate entering into the bed, i.e. without altering the flow channels or other cross-sectional geometry of the vessel. Such proportional change in bed height will keep the gas velocity flowing into the bed unchanged and accordingly, the bed pressure drop will be unchanged. Thus, the teachings of the invention can be exploited to create a standard vessel design (fixed vessel and basket diameters) in cross section (simplifying fabrication and reducing vessel cost) to satisfy a relatively significant range of feed and/or product mass flow rates by altering only the vessel height.

The vessel height cannot be increased without limit as the channel mass flow rates are increased. Maintaining the cross-sectional area of the flow channels for an increased mass flow rate will result in higher channel velocity and an increase in the channel pressure drop. Increasing the channel pressure drop without increasing bed pressure drop will begin to adversely affect the uniformity of the flow distribution when the vessel height is increased too much. Therefore, either the channel pressure drop should be reduced by enlarging the channel or the bed pressure drop should be increased to obtain a more even flow distribution. Thus, vessel diameter is increased and basket geometries adjusted to create a new standard vessel design which can then be utilized over a second range of mass flow rates. Therefore, the entire range of flows for a given process can be satisfied with one or several standard vessel sizes.

The effect of increasing mass flow rate on the ratio of outer channel pressure drop to bed pressure drop for a fixed bed pressure drop is illustrated in further detail in Example 1 below.

Example 1

Figure 5:
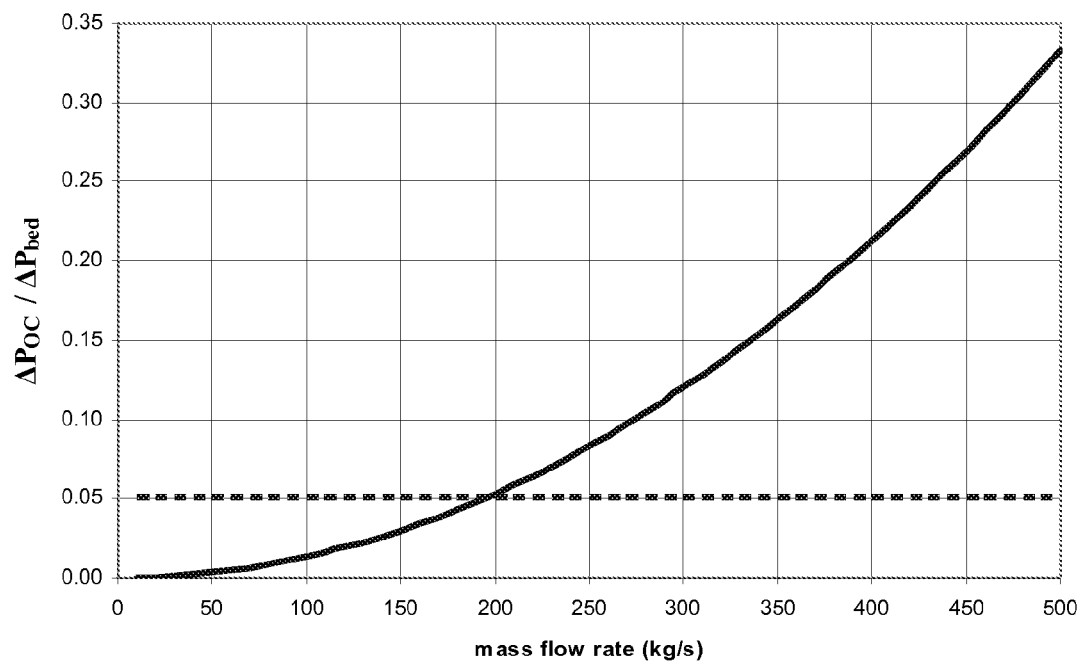
FIG. 5 is a graph showing the effect of increasing the mass flow on the ratio of the channel pressure drop to bed pressure drop for a fixed bed pressure drop.

The effect of increasing mass flow rate on the ratio of outer channel pressure drop to bed pressure drop for a fixed bed pressure drop is investigated for a purification process using the pressure drop formulations. In this example, air at 652.9 kPa and 280K with a 121 kg/s mass flow rate enters into the radial flow bed from the outer channel. The radial vessel has a diameter of 5.1 m, an outer channel width of 0.25 m and an inner channel radius of 1.12 m. The radial bed has a 1.22 m transfer length and 10.06 m bed height. It is composed of adsorbent particles having an average diameter of 2.1 mm packed to give a 37% bed void percentage (bed void fraction=0.37). In this vessel geometry, the cross-sectional areas of inner and outer channels are equal to each other. In the analysis, the mass flow rate entering into the radial vessel is proportionally increased with the bed height so that gas flow velocity entering into the bed and the resulting bed pressure drop is kept constant. No other geometrical parameter is altered in the analysis. Even though bed pressure drop is unchanged, the outer channel pressure drop increases as the mass flow rate within this channel increases, i.e. feed flow is increased as bed height is increased. Therefore, the ratio of outer channel pressure drop to bed pressure drop increases, as shown in FIG. 5, beyond the preferred ratio of 0.05 (5%). This result suggests that increasing mass flow rate beyond some acceptable level (200 kg/s in this example) proportionally with bed height to process more gas without increasing the gas channel sizes will result in flow maldistribution.

Example 2

Figure 6:
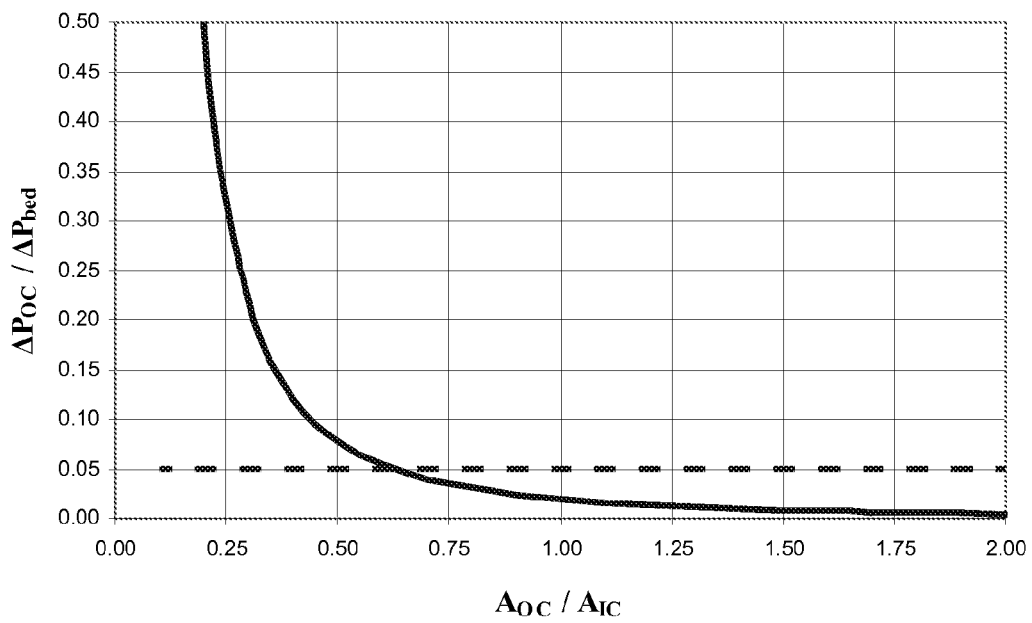
FIG. 6 is a graph showing the effect of the ratio of the feed channel to product channel cross-sectional area on the ratio of feed (outer) channel pressure drop to bed pressure drop.

As mentioned earlier, the cross-sectional areas of the inner and outer channels should be substantially equal to each other to achieve uniform flow distribution when the feed and product mass flow rates are substantially equal. The effect of the ratio of the outer channel to the inner channel cross-sectional area on the ratio of outer channel pressure drop to bed pressure drop was investigated using the same vessel configuration and process described in Example 1. The inner channel is selected here as the product channel. In this analysis, the size of the inner channel, bed height, bed transfer length and mass flow rate entering into the vessel remain fixed. The resulting bed pressure drop is, therefore, fixed as well. The area of the outer channel is incrementally increased by increasing the vessel diameter and the corresponding pressure drop in the outer channel is calculated. The resultant ratio of the outer channel (feed channel) pressure drop to the bed pressure drop is shown as a function of the ratio of outer channel (feed channel) cross-sectional area to inner channel (product channel) cross-sectional area in FIG. 6. The most preferable channel pressure drop to bed pressure drop ratio of 5% or less (as a measure of uniform flow distribution) is achieved for ratios of feed channel to product channel cross-sectional area of at least 0.70. Channel area ratios less than 0.7 result in pressure drop ratios higher than 0.05, i.e. leading to increasing non-uniformity of the flow distribution. Channel area ratios greater than 1.4 result in excessive vessel volume/diameter leading to higher fabrication costs.

Example 3

Flow Simulation

Figure 7:
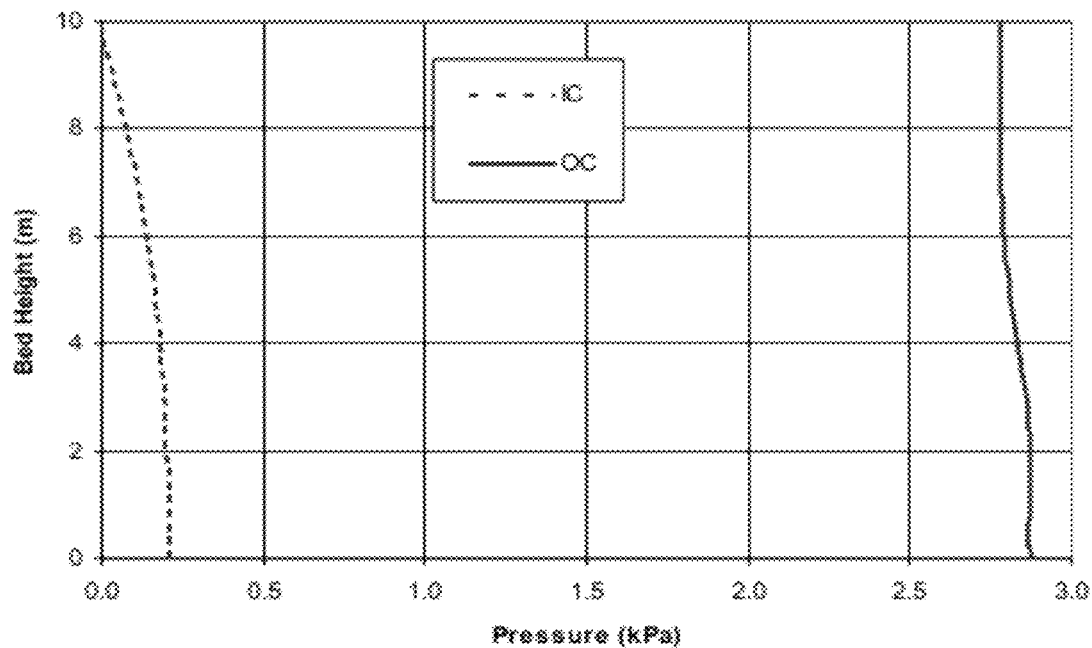
FIG. 7 is a graph showing the pressure drops in the inner channel, outer channel, and bed during feed flow.
Figure 8:
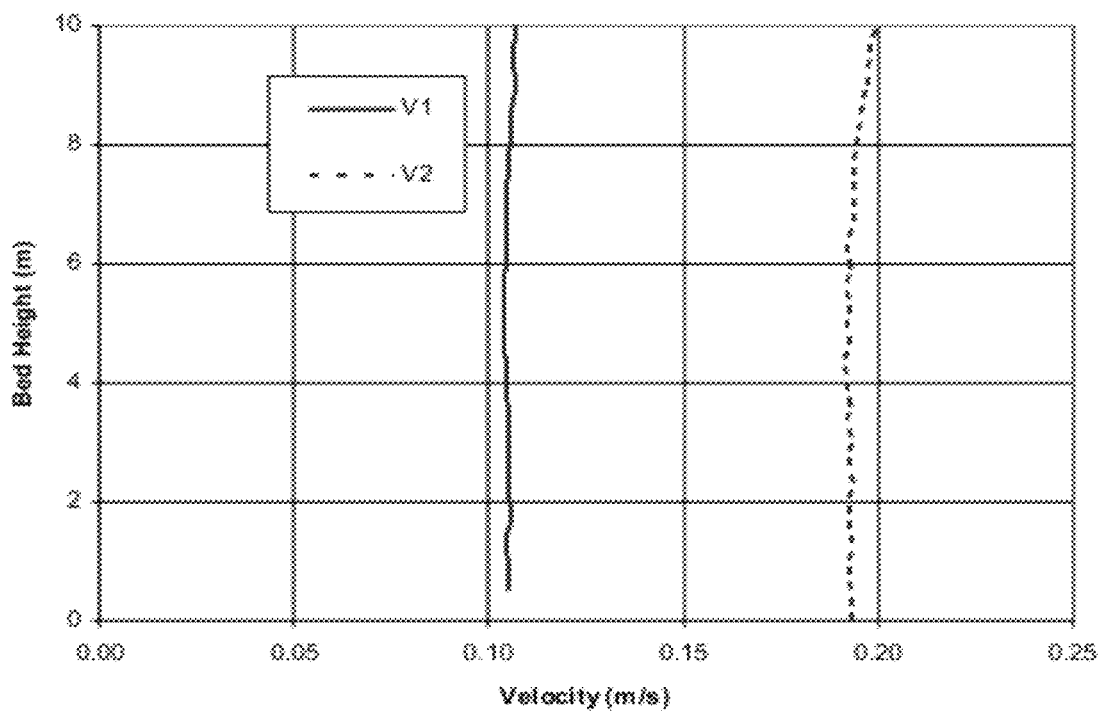
FIG. 8 is a graph showing the velocity profiles for feed flow entering (V1) and product flow exiting (V2) the bed along the bed height during the feed step of the process.

A computational fluid dynamics simulation was run to verify the design guideline set out in this invention. The process gas and radial flow vessel as specified in Example 1 are used in the simulation. For this geometry, the areas of the inner and outer channels are almost equal to each other ($A_{IC} \approx A_{OC}$). Results, as shown in FIG. 7, suggest that both the inner and outer channel pressure drop are of the order of 138-207 Pa (0.02-0.03 psi), and are significantly lower than the bed pressure drop of 2.76 kPa (0.40 psi), i.e. less than $0.10 \cdot \Delta P_{Bed}$. The local bed pressure drop is simply the difference between the inner and outer channel pressures at that bed height. As the pressure difference between the outer and inner channels is the paramount driving force for the gas flow, significantly lower pressure drop within each channel relative to bed pressure drop ensures uniform distribution of flow through the bed. Resulting channel velocity profiles, as shown in FIG. 8, for the gas flow entering into the bed (V1) from its outer boundary and the gas flow exiting out of the bed (V2) through its inner boundary both show less than 4% flow maldistribution. Similar pressure drop and velocity profiles obtained for flow in reversed direction also confirm satisfactory flow distribution for reversed flow. In FIG. 7 the difference in pressure from the bottom to the top of the channel (bed height) represents the channel pressure drop, while in FIG. 8 the variation in radial velocity is shown for each basket face along the bed height.

For industrial scale radial flow reactors, this invention preferably applies to vessels having a diameter of equal to or greater than 1.0 m, a bed height of equal to or greater than 2.0 m and a bed depth of equal to or greater than 0.3 m.

It should be apparent to those skilled in the art that the subject invention is not limited by the examples provided herein which have been provided to merely demonstrate the operability of the present invention. The scope of this invention includes equivalent embodiments, modifications, and variations that fall within the scope of the attached claims.

What is claimed is:

1. A radial bed vessel comprising:
a substantially cylindrical vessel shell having a vertical longitudinal axis, an upper cap and a lower cap;
a substantially cylindrical porous outer basket disposed concentrically inside the shell along the longitudinal axis and attached to at least one of the upper cap and the bottom cap;
a substantially cylindrical porous inner basket disposed concentrically inside the porous outer basket along the longitudinal axis and attached to at least one of the upper cap or the lower cap of the vessel;
a substantially annular outer channel disposed between the vessel shell and outer basket along the longitudinal axis having a cross-sectional flow area capable of transporting either a feed fluid or a product fluid;
a substantially cylindrical inner channel disposed inside the inner basket along the longitudinal axis having a cross-sectional flow area capable of transporting either a feed fluid or a product fluid;
a substantially annular bed composed of at least one layer of active material disposed in the annular space between the inner and the outer baskets;
wherein:
the ratio of the cross-sectional flow area of the channel transporting the feed fluid to the cross-sectional flow area of the channel transporting the product fluid is in proportion to the ratio of the mass flow rate of the feed fluid to the mass flow rate of the product fluid with the proportionality constant greater than or equal to 0.7 and less than or equal to 1.4; and
the annular bed has a bed height and a bed transfer length sized such that the pressure change over the lengths of the inner and the outer channels are each less than or equal to 10% of the pressure drop across the bed under the process operating conditions for the fluid employed.

2. The radial bed vessel of claim 1 wherein the pressure change is a pressure drop.

3. The radial bed vessel of claim 2 wherein the vessel is designed such that the ratio of the channel cross-sectional flow areas is proportional to the ratio of mass flow rates with the proportionality constant greater than or equal to 0.85 and less than or equal to 1.2.

4. The radial bed vessel of claim 2 wherein the vessel includes at least one of the following parameters; a diameter of equal to or greater than 1.0 m, a bed height of equal to or greater than 2.0 m, and a bed depth of equal to or greater than 0.3 m and provides for a uniform flow distribution of the process fluid through the bed.

5. The radial bed vessel of claim 2 wherein the inner basket and the outer basket have walls made of perforated material with the open areas of the walls being greater than 15%.

6. The radial bed vessel of claim 2 wherein the cross-sectional flow areas of the channels transporting the feed and product fluids are substantially equal and the mass flow rates of the feed fluid and the product fluid are substantially equal.

7. The radial bed vessel of claim 1 wherein the substantially cylindrical inner channel is substantially annular.

8. A fluid purification, separation or reaction process comprising passing a feed fluid through a bed of active material in a radial bed vessel comprising:
- a substantially cylindrical vessel shell having a vertical longitudinal axis, an upper cap, and a lower cap;
- a substantially cylindrical porous outer basket disposed concentrically inside the shell along the longitudinal axis and attached to at least one of the upper cap and the lower cap;
- a substantially cylindrical porous inner basket disposed concentrically inside the porous outer basket along the longitudinal axis and attached to at least one of the upper cap and the lower cap of the vessel;
- a substantially annular outer channel disposed between the vessel shell and the outer basket along the longitudinal axis having a cross-sectional flow area capable of transporting either a feed fluid or a product fluid;
- a substantially cylindrical inner channel disposed inside the inner basket along the longitudinal axis having a cross-sectional flow area capable of transporting either a feed fluid or a product fluid;
- a substantially annular bed composed of at least one layer of active material disposed in the annular space between the inner and the outer baskets;

wherein:
- the ratio of the cross-sectional flow area of the channel transporting the feed fluid to the cross-sectional flow area of the channel transporting the product fluid is in proportion to the ratio of the mass flow rate of the feed fluid to the mass flow rate of the product fluid with the proportionality constant greater than or equal to 0.7 and less than or equal to 1.4; and
- the annular bed has a bed height and a bed transfer length sized such that the pressure change over the lengths of the inner and the outer channels are each less than or equal to 10% of the pressure drop across the bed under the operating conditions for the process fluid employed.

9. The process of claim 8 wherein the pressure change is a pressure drop.

10. The process of claim 9 wherein the process is an adsorption based gas separation process having uniform flow.

11. The process of claim 10 wherein the gas separation process is selected from the group consisting of a pressure swing adsorption, a vacuum swing adsorption, a vacuum pressure swing adsorption and a thermal swing adsorption process.

12. The process of claim 11 wherein the process is used for the pre-purification of air.

13. The process of claim 12 wherein the process uses a zeolite-type molecular sieve.

14. The process of claim 13 wherein the bed is densely packed and the bed void fraction is greater than or equal to 0.30 and less than or equal to 0.50.

15. The process of claim 14 wherein the molecular sieve has a mass average diameter of equal to or greater than 0.5 mm and less than or equal to 5.0 mm.

16. The process of claim 8 wherein the pressure drop across the bed is greater than or equal to 1.0 kPa (0.15 psi).

17. The process of claim 8 wherein the ratio of the channel cross-sectional flow areas is in proportion to the ratio of the mass flow rates with the proportionality constant greater than or equal to 0.85 and less than or equal to 1.2.

18. The process of claim 17 wherein the cross-sectional flow areas of the channels transporting the feed and product fluids are substantially equal and the mass flow rates of the feed fluid and the product fluid are substantially equal.

19. The process of claim 9 wherein the wherein the channel pressure drops are less than or equal to 5% of the bed pressure drop.

20. A gas separation process comprising treating a process gas in a radial bed vessel of the type having a substantially cylindrical vessel shell on a vertical longitudinal axis with a connected upper cap and lower cap; a substantially cylindrical porous outer basket disposed concentrically inside the shell along the longitudinal axis and attached to at least one of the upper cap and the lower cap; a substantially cylindrical porous inner basket disposed concentrically inside the outer basket along the longitudinal axis and attached to at least one of the upper cap and the lower cap thereby defining a annular space between the outer and the inner baskets for containing active material;

and wherein the vessel further comprises a substantially cylindrical inner channel disposed inside the inner basket along the longitudinal axis and a substantially annular outer channel disposed between the vessel shell and the outer basket along the longitudinal axis; each of the channels having a cross-sectional flow area for transporting a product gas or a feed gas;

the improvement comprising wherein the ratio of the cross-sectional flow areas of the channels transporting the feed and product gases is in proportion to the ratio of the mass flow rates of the feed and product gases being transported through the channels as follows:

$$\frac{A_{feed}}{A_{product}} \geq 0.70 \cdot \left(\frac{m_{feed}}{m_{product}}\right) \text{ for } A_{feed} < A_{product}$$

$$\frac{A_{feed}}{A_{product}} \leq 1.40 \cdot \left(\frac{m_{feed}}{m_{product}}\right) \text{ for } A_{feed} > A_{product}$$

and
wherein the pressure drop over the length of each channel is less than or equal to 10% of the pressure drop across the bed under the operating conditions for the process gas employed.

21. The process of claim 20 having even flow distribution of the process gas through the radial bed vessel.

22. The process of claim 21 wherein the ratio of the cross-sectional flow areas of the channels is in proportion to the ratio of the mass flow rates of feed and product gases with the proportionality constant greater than or equal to 0.85 and less than or equal to 1.2 and the pressure drop over the length of each channel is less than or equal to 5% of the pressure drop across the bed.

23. The process of claim 22 wherein the gas separation process is selected from the group consisting of a pressure swing adsorption, a vacuum swing adsorption, a vacuum pressure swing adsorption and a thermal swing adsorption process.

24. The process of claim 23 wherein the bed pressure drop is less than or equal to 20.7 kPa (3 psi).

25. The process of claim 20 wherein the pressure drop across the bed is greater than or equal to 1.0 kPa (0.15 psi) and the pressure drop over the lengths of the channels are each less than or equal to 5% of the pressure drop across the bed.

26. The process of claim 20 wherein the substantially cylindrical inner channel is substantially annular.

27. The process of claim 20 wherein the inner channel is used to transport the product gas and has occluded flow.

28. The process of claim 20 wherein the process exhibits uniform flow.

29. A uniform flow, gas separation process for the separation of a selectively absorbable gas component from a feed gas mixture having a selectively absorbable gas component and at least one less selectively absorbable gas component wherein the process is conducted in a radial bed reaction vessel comprising passing the feed gas mixture through a feed gas channel to a bed containing adsorption material capable of adsorbing the selectively absorbable gas component, passing the at least one less selectively absorbable gas component through the bed to a product channel and recovering the at least one less selectively absorbable gas component as the product gas;

and wherein the ratio of the cross-sectional flow area of the feed gas channel to the cross-sectional flow area of the product gas channel is in proportion to the ratio of the mass flow rate of the feed gas mixture to the mass flow rate of the product gas with the proportionality constant greater than or equal to 0.7 and less than or equal to 1.4; and the bed has a bed height and a bed transfer length sized such that the pressure change over the lengths of the channels are each less than or equal to 10% of the pressure drop across the bed under the operating conditions for the process gas employed.

30. The process of claim 29 wherein the process is an air separation process and the product gas contains oxygen.

\* \* \* \* \*